United States Patent
Reuter

(10) Patent No.: US 6,323,422 B1
(45) Date of Patent: Nov. 27, 2001

(54) CABLE ENTRY FOR A SWITCH CABINET

(75) Inventor: Wolfgang Reuter, Burbach (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/463,003

(22) PCT Filed: Jul. 11, 1998

(86) PCT No.: PCT/EP98/04303

§ 371 Date: Jan. 14, 2000

§ 102(e) Date: Jan. 14, 2000

(87) PCT Pub. No.: WO99/04471

PCT Pub. Date: Jan. 28, 1999

(30) Foreign Application Priority Data

Jul. 16, 1997 (DE) .............................................. 197 30 428

(51) Int. Cl.[7] ..................................................... H02G 3/14
(52) U.S. Cl. ............................... 174/50; 174/58; 220/4.02
(58) Field of Search .............................. 174/48, 50, 17 R, 174/58; 220/3.2, 3.3, 4.02; 248/906; 439/535

(56) References Cited

U.S. PATENT DOCUMENTS

| 4,670,623 | * | 6/1987 | Siffrin | 174/50 |
| 4,963,696 | * | 10/1990 | Owen et al. | 174/50 |
| 5,079,389 | * | 1/1992 | Nelson | 174/48 |
| 5,107,073 | * | 4/1992 | Steffen | 174/52.1 |
| 5,300,731 | * | 4/1994 | DeBaratolo, Jr. et al. | 174/48 |
| 5,422,436 | * | 6/1995 | Zachrai | 174/65 R |

FOREIGN PATENT DOCUMENTS

| 78 16 729 | 9/1978 | (DE) . |
| 27 20 936 | 11/1978 | (DE) . |
| 196 04 219 C1 | 6/1997 | (DE) . |

* cited by examiner

Primary Examiner—Dean A. Reichard
Assistant Examiner—Dhiru R Patel
(74) Attorney, Agent, or Firm—Pauley Petersen Kinne & Fejer

(57) ABSTRACT

A cable entry for a switch cabinet having an opening positioned in a floor of the switch cabinet and surrounded by a connecting layer. The opening can be closed off with bottom plates which can be placed one next to each other and connected to the connecting layer. The sides of adjoining bottom plates assigned to each other have angled edges fitted with sealing strips. The cables are fed into the switch cabinet between the sealing strips and sealed by deformation of the sealing strips. This invention provides for the edges of the bottom plates to be configured as a double fold, a first section of which points towards the upper or lower side of the bottom plate while the second end section of the double fold extends across the first section and protrudes from the lower or upper side of the bottom plate. The sealing strips extend across the width of the end section of the double fold. This results in a sufficiently broad sealing area using a simple bottom plate which only insignificantly limits the installation space available above and below the bottom plate.

12 Claims, 1 Drawing Sheet

CABLE ENTRY FOR A SWITCH CABINET

BACKGROUND OF THE INVENTION

1. Field of the Invention

This invention relates to a cable lead-in for a switchgear cabinet with an opening in a bottom of the switchgear cabinet, which is surrounded by a connecting support. The opening can be closed by bottom plates, which can be lined up with each other and connected with the connecting support. The sides of adjoining bottom plates which are associated with each other have beveled edges with sealing strips fastened thereon, and the cables are inserted into the switchgear cabinet and sealed by deforming the sealing strips.

2. Description of Related Art

Such a cable lead-in is known from German Patent Reference DE 78 16 729 U1 wherein sealing strips are embodied as plastic foam blocks. When adjoining bottom plates are lined up with each other, the cables introduced between the plastic foam blocks of adjoining bottom plates are sealed. While lining up, the bottom plates are pressed against each other and the plastic foam blocks are deformed in the process. In this case the edges of the bottom plates are uniformly beveled toward one side of the bottom plates, so that with a sufficiently wide sealing area there must be sufficient space on this side of the bottom plates for these edges. Thus, the installation space above the bottom plate is correspondingly reduced.

As shown in German Patent Reference DE 196 04 219 C1, it is also known to attach an additional edge on one side of a bottom plate, which is oriented toward the other side of the bottom plate. In this way edge areas are created outside of the sealing strip, which can have a row of fastening means for the strain-relieved and/or electrically conducting connection of the cables with the bottom plate.

SUMMARY OF THE INVENTION

It is one object of this invention to provide a cable lead-in of the type mentioned above but which results in a sufficiently wide sealing area without essentially restricting the installation space above and under the bottom plate, and without making production of the bottom plate considerably more expensive.

In accordance with this invention, this object is achieved with edges of the bottom plates designed as double seams, one section of which is pointed toward the top or bottom of the bottom plate, while the second end section of the double seam extends both over the first section and projects in relation to the top or bottom of the bottom plate. The sealing strip extends over the width of the end section of the double seam.

The edge of the bottom plate embodied as a double seam is easy to produce and extends over both sides of the bottom plate. Thus, even with a broader sealing area the installation space above as well as under the bottom plate is only negligibly restricted.

So that the bottom plate can be easily connected with the connection support of the switchgear cabinet, in one embodiment on the sides without a double seam the bottom plate extends past the double seam by means of support edges. In this case, the double seam does not interfere with the placement of the bottom plate on the connection support of the switchgear cabinet.

If a cable lead-in is provided on only one side of the bottom plate, the bottom plate is simplified because the bottom plates have a single-beveled edge on the side opposite the double seam.

The single-beveled edge does not interfere with the connection between the bottom plate and the connection support if the single-beveled edge projects away from the underside of the bottom plate and terminates in front of the support sections of the bottom plate.

The corners of the support sections of the bottom plate are preferably slanted.

In one preferred embodiment, the end section of the double seam projects past equal portions on the top and bottom of the bottom plate.

If a strain-relieved or electrically conducting connection of the cables with the bottom plate is desired, in a further embodiment the end section of the double seam is widened at least on one side past the fixed-in-place sealing strip and has in this area at least one row of fastening means for the strain-relieved and/or electrically conducting connection of the cables with the bottom plate.

BRIEF DESCRIPTION OF THE DRAWING

This invention will be explained in greater detail by means of a preferred embodiment represented in a perspective view in the drawing.

DESCRIPTION OF PREFERRED EMBODIMENTS

Figure 1:
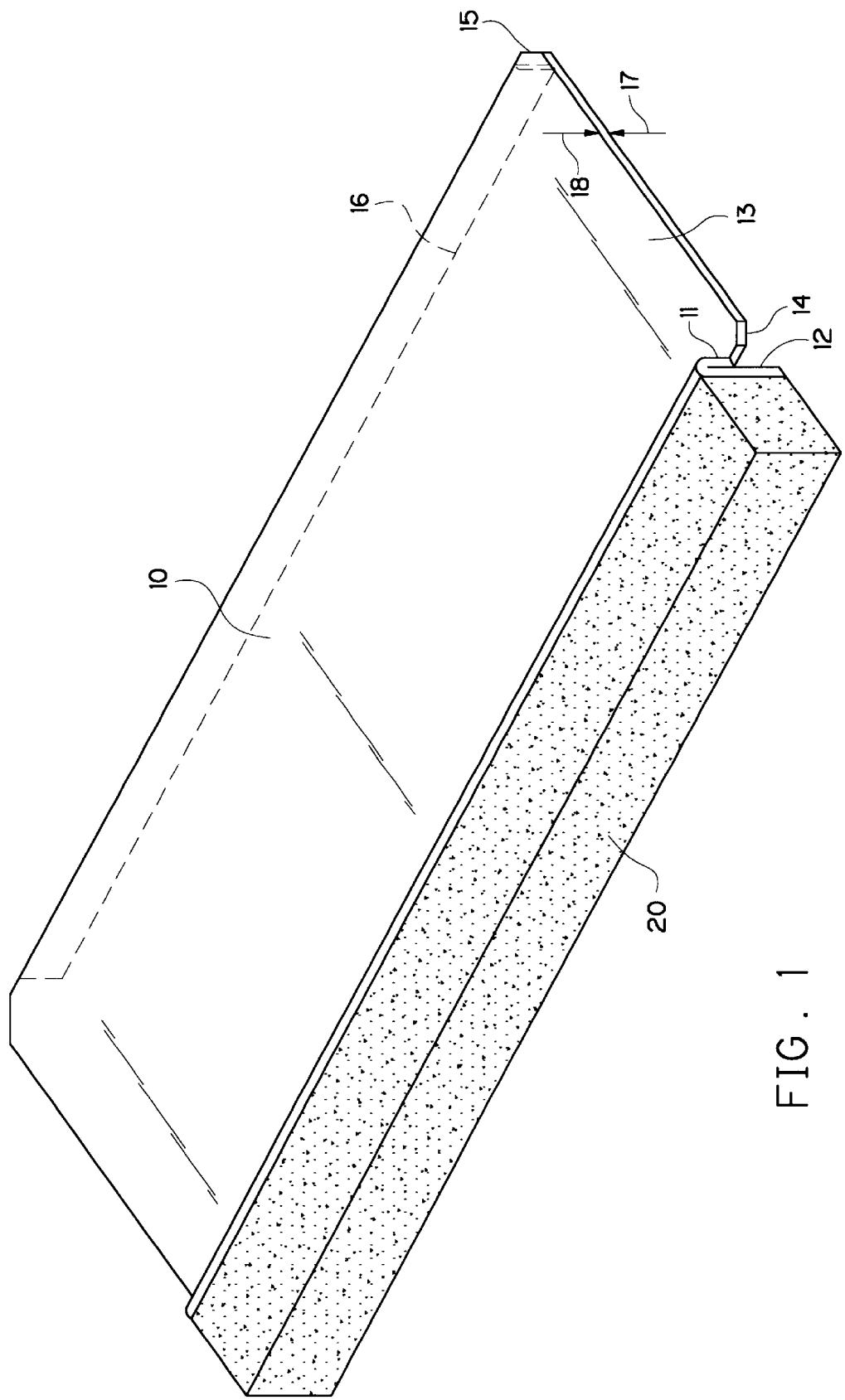

The bottom plate 10, which is shown in a perspective view in the drawing, is designed as a rectangle and has a cable guide on only one side. This long side has a double seam, which is beveled off this side of the bottom plate 10, in a simple manner. In this case a first section 11 is oriented toward the top 18 of the bottom plate, and an end section 12 extends over and rests on the first section 1, and does not protrude at the bottom 17 of the bottom plate 10. The sealing strip 20, designed as a plastic foam block, extends over an entire width of the end section 12. The double seam terminates at both ends in front of the narrow sides of the bottom plate 10, which are used as support edges 13 for connecting the bottom plate 10 with the connection support of the switchgear cabinet. The edges of the bottom plate 10 are slanted, as indicated by means of the inclines 14 and 15. On the side opposite the double seam with the sealing strip 20, the bottom plate 10 has a single edge 16 angled toward the bottom 17 which, corresponding to the double seam, terminates in front of the support edges 13. It is possible to also provide this side of the bottom plate 10 with a double seam and a sealing strip 20. Also, the first section 11 can be directed toward the bottom 17, and the single-beveled edge 16 of the bottom plate 10 toward the top of the bottom plate 10.

The end section 12 can also be widened past the sealing strip 20 and have a row of fastening means for the strain-relieved and/or electrically-conducting connection of the inserted cables with the bottom plate 10.

What is claimed is:

1. In a cable lead-in for a switchgear cabinet with an opening in a bottom of the switchgear cabinet, wherein the opening is surrounded by a connecting support, the opening can be closed by a bottom plate which can be lined up with other like bottom plates and connected with the connecting support, first sides of the bottom plate which are associated with the other like bottom plates have beveled edges with fastened sealing strips, and cables are inserted into the switchgear cabinet and sealed by deforming the sealing strips, the improvement comprising:

an edge of the bottom plate (10) designed as a double seam including a first section (11) pointed toward one of a top and a bottom of the bottom plate (10) and a second section (12) of the double seam extending over the first section (11) and projecting in relation to the one of the top and the bottom of the bottom plate (10), and a sealing strip (20) extending over a width of the second section (12) of the double seam.

2. In the cable lead-in in accordance with claim 1, wherein on second sides without the double seam, support edges (13) of the bottom plate (10) extend beyond the double seam.

3. In the cable lead-in in accordance with claim 2, wherein the bottom plate (10) has a single-beveled edge (16) on a third side opposite the double seam.

4. In the cable lead-in in accordance with claim 3, wherein the single-beveled edge (16) projects away from the bottom of the bottom plate (10) and terminates in front of the support edges (13) of the bottom plate (10).

5. In the cable lead-in in accordance with claim 4, wherein corners of the support edge (13) having inclines (14, 15).

6. In the cable lead-in in accordance with claim 5, wherein the second section (12) of the double seam projects past equal portions on the top and the bottom of the bottom plate (10).

7. In the cable lead-in in accordance with claim 5, wherein the second section (12) of the double seam is widened at least on one side beyond the fixed sealing strip (20) and has in an area at least one row of fastening means for at least one of a strain-relieved and an electrically conducting connection of the cables with the bottom plate (10).

8. In the cable lead-in in accordance with claim 2, wherein corners of the support edges (13) have inclines (14, 15).

9. In the cable lead-in in accordance with claim 1, wherein the bottom plate (10) has a single-beveled edge (16) on a second side opposite the double seam.

10. In the cable lead-in in accordance with claim 9, wherein the single-beveled edge (16) projects away from the bottom of the bottom plate (10) and terminates in front of support edges (13) of the bottom plate (10).

11. In the cable lead-in in accordance with claim 1, wherein the second section (12) of the double seam projects past equal portions on the top and the bottom of the bottom plate (10).

12. In the cable lead-in in accordance with claim 1, wherein the second section (12) of the double seam is widened at least on one side beyond the fixed sealing strip (20) and has in an area at least one row of fastening means for at least one of a strain-relieved and an electrically conducting connection of the cables with the bottom plate (10).

* * * * *